(12) United States Patent
Archambault et al.

(10) Patent No.: US 7,615,090 B2
(45) Date of Patent: Nov. 10, 2009

(54) COMPACT CENTRAL VACUUM UNIT

(75) Inventors: Marc-Antoine Archambault, Montreal (CA); Dave Plourde, Montreal (CA)

(73) Assignee: NuEra Solutions Air Inc./NuEra Air Solutions Inc., Laval, Quebec (CA)

( * ) Notice: Subject to any disclaimer, the term of this patent is extended or adjusted under 35 U.S.C. 154(b) by 523 days.

(21) Appl. No.: 11/350,099

(22) Filed: Feb. 9, 2006

(65) Prior Publication Data

US 2006/0213161 A1 Sep. 28, 2006

Related U.S. Application Data

(60) Provisional application No. 60/651,077, filed on Feb. 9, 2005.

(51) Int. Cl.
 *B01D 51/00* (2006.01)
(52) U.S. Cl. .................. 55/467; 55/337; 55/DIG. 3; 55/428; 55/429; 55/472; 55/473; 15/353
(58) Field of Classification Search .............. 55/337, 55/DIG. 3, 467, 428–429, 472–473; 15/353
See application file for complete search history.

(56) References Cited

U.S. PATENT DOCUMENTS

| | | | | |
|---|---|---|---|---|
| 5,922,093 A * | 7/1999 | James et al. | ................. | 55/322 |
| 6,432,154 B2 * | 8/2002 | Oh et al. | ................. | 55/423 |
| 6,436,160 B1 * | 8/2002 | Stephens et al. | ................. | 55/337 |
| 6,640,385 B2 * | 11/2003 | Oh et al. | ................. | 15/352 |
| 6,775,882 B2 * | 8/2004 | Murphy et al. | ................. | 15/352 |
| 6,804,857 B1 | 10/2004 | Olewiler, III | | |
| 6,810,558 B2 * | 11/2004 | Lee | ................. | 15/353 |
| 7,300,482 B2 * | 11/2007 | North | ................. | 55/312 |
| 2002/0124538 A1 * | 9/2002 | Oh et al. | ................. | 55/426 |
| 2005/0223520 A1 * | 10/2005 | Greene et al. | ................. | 15/353 |
| 2006/0037291 A1 * | 2/2006 | Oh et al. | ................. | 55/337 |

* cited by examiner

*Primary Examiner*—Matthew O Savage
*Assistant Examiner*—Dung Bui
(74) *Attorney, Agent, or Firm*—Ogilvy Renault LLP

(57) ABSTRACT

A central vacuum unit comprises a cyclonic chamber having a sidewall. A motor causes a swirl of air loaded with debris to centrifugally contact an inner surface of the sidewall of the cyclonic chamber. A lateral outlet is defined through the sidewall to provide for lateral discharge of the debris from the cyclonic chamber.

14 Claims, 4 Drawing Sheets

COMPACT CENTRAL VACUUM UNIT

RELATED APPLICATION(S)

This claims benefit of U.S. Provisional Patent Application No. 60/651,077 filed on Feb. 9, 2005.

BACKGROUND OF THE INVENTION

1. Field of the Invention

The present invention relates to a central vacuum unit, and more particularly to a compact central vacuum unit.

2. Background Art

It is common place for a central vacuum unit to be installed near or even in a living space. However, central vacuum units presently on the market come with many disadvantages. Generally, central vacuum units take up a lot of space, and more particularly vertical space. Consequently, it can be difficult to find a location to install such a unit. Ideally, an individual may want to install such a unit in a closet or in any other small enclosed area. Therefore there is a need for a more compact central vacuum unit with equivalent characteristics to the regular units on the market.

Another disadvantage lies in the fact that central vacuum units tend to generate unacceptable levels of noise. Even though the prior art reveals the introduction of sound absorbing materials and mufflers as well as other means intended to reduce the levels of noise emitted by existing central vacuum units, there is still a need for a more quiet unit.

A further disadvantage lies in the fact that typically central vacuum units are problematic to clean. The cage being permanently attached below the motor and the debris being collected in a canister attached below the chamber housing the motor causes the problem. When the canister is detached and removed to empty the contents thereof, any debris left on the filter covering the cage may fall to the floor. Even more, changing the filter results in a very messy outcome. Therefore, there is a strong need for a central vacuum unit that is less problematic to clean.

Also, the carbon dust generated by the motor of conventional central vacuum units is discharged directly into the surrounding environment preventing the installation of such units in closets where articles of clothing or food are stored.

There is thus a need for a new central vacuum unit which addresses the above-mentioned problems.

SUMMARY OF INVENTION

It is therefore an aim of the present invention to provide a compact central vacuum unit.

It is another aim of the present invention to provide a central vacuum unit that is relatively easy to clean.

Therefore, in accordance with a first aspect of the present invention, there is provided a central vacuum unit comprising a cyclonic chamber having a sidewall, and a motor causing a swirl of air loaded with debris to centrifugally contact an inner surface of the sidewall of said cyclonic chamber, and a lateral outlet defined through said sidewall to provide for lateral discharge of the debris from said cyclonic chamber.

In accordance with a further general aspect of the present invention, there is provided a central vacuum unit comprising a motor drawing a first flow of air along a working path, and a fan circulating a second flow of air along a cooling path, wherein the second flow of air is drawn out of the cooling path into the working path by the first flow of air before both the first and second flows be jointly discharged through a common outlet.

BRIEF DESCRIPTION OF THE DRAWINGS

Reference will now be made to the accompanying drawings, showing by way of illustration a preferred embodiment thereof and in which.

DESCRIPTION OF THE PREFERRED EMBODIMENTS

Figure 1:
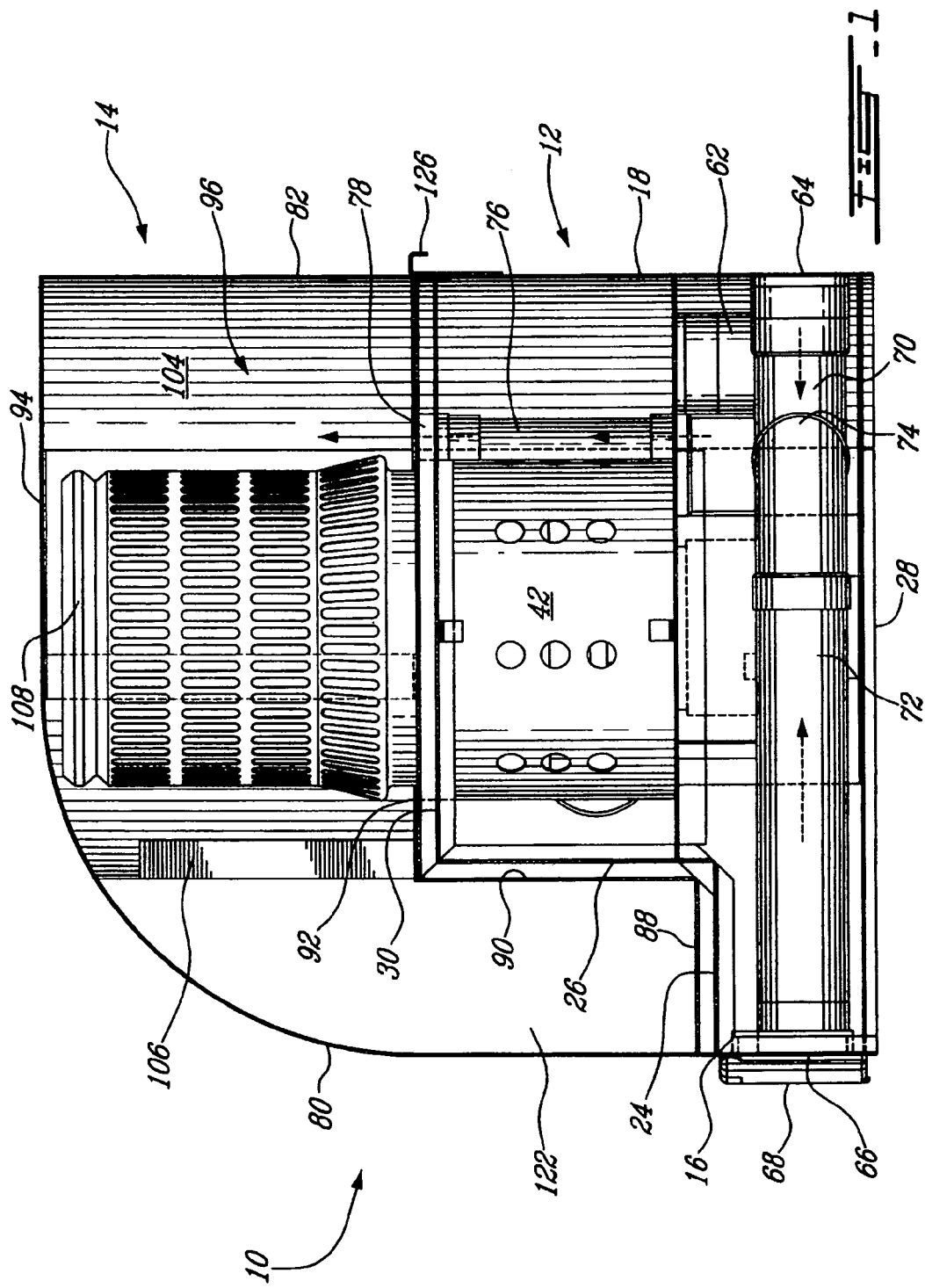
FIG. 1 is a side elevation view of a central vacuum unit in accordance with an embodiment of the present invention, the casing of the unit being illustrated as transparent to reveal the internal details of the unit.

Referring now to the drawings in greater detail and by reference characters thereto, there is illustrated a preferred embodiment of a central vacuum unit identified by reference numeral 10. The central vacuum unit 10 has a working airflow and a cooling airflow: the former being the air with particles of dust and other matter that requires cleaning, the latter being the air that cools the mechanical components thereof. The central vacuum unit 10 is of the type adapted to interact with a network of suction ducts (not shown) extending into various rooms of a building whereby each duct terminates in a suction inlet for drawing dirt and dust from in the room. The central vacuum unit 10 may also be employed as a conventional portable vacuum cleaner by attaching an extension with a nozzle thereto and manually pointing the nozzle at the area to be cleaned. Also, the central vacuum unit 10 may be utilized independently to filter the air of its surrounding environment.

Referring concurrently to FIGS. 1 to 4, the central vacuum unit 10 comprises first and second sections 12 and 14 adapted to mate in an overlapping configuration with the second section 14 overlapping the first section 12. The first and second sections 12 and 14 may be interlocked by various attachment means such as clips and the like (not shown). Particularly, the first section 12 has a step-shaped side cross-section and the second section 14 has a corresponding inverted step-shaped cross-section.

Figure 2:
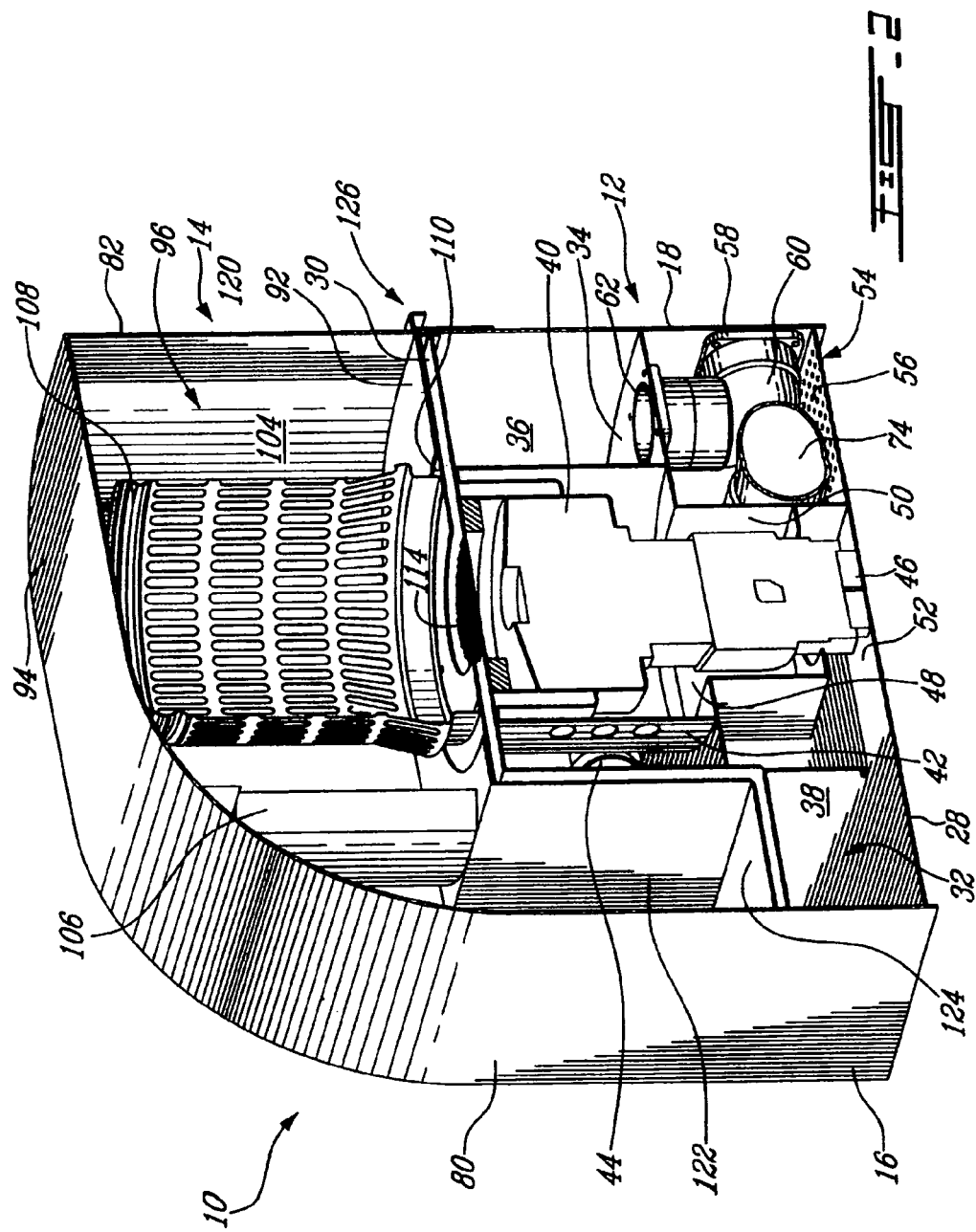
FIG. 2 is a sectioned perspective view of the central vacuum unit shown in FIG. 1.
Figure 3:
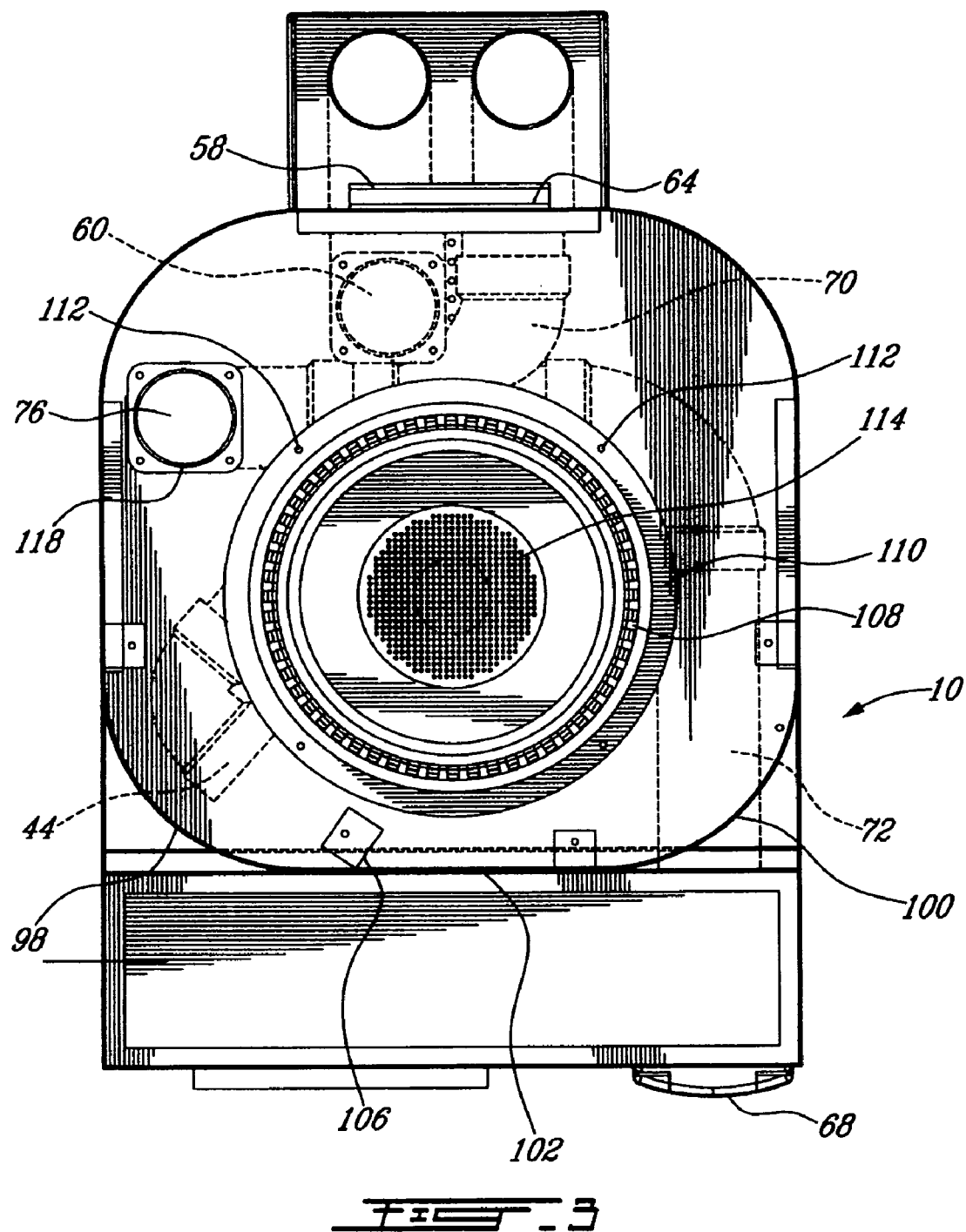
FIG. 3 is a top view of the central vacuum unit shown in FIG. 1, the casing being once again shown as transparent for illustration purposes.
Figure 4:
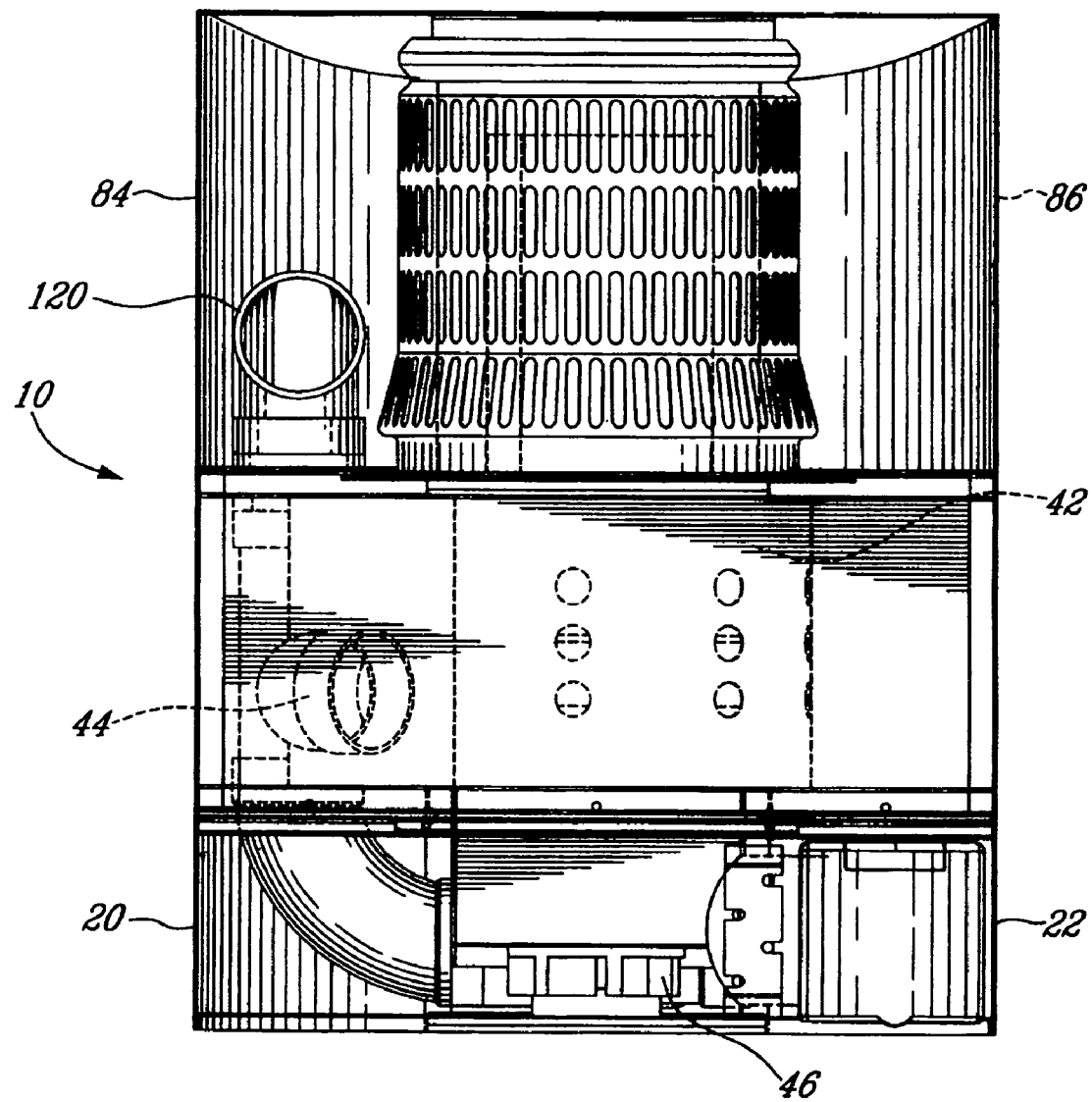
FIG. 4 is a front elevation view of the central vacuum unit shown in FIG. 1 with the casing illustrated as transparent to permit visualization of the internal parts of the unit.

Now referring more specifically to FIG. 1, it can be seen that the first section 12 of the central vacuum unit 10 is made up of a front face 16, a rear face 18, two side faces 20 and 22 (FIG. 4), horizontal and vertical step faces 24 and 26, and is enclosed by a bottom and a top face 28 and 30 respectively. Preferably, the vertical step face, rear and side faces 26, 18, 20, 22 respectively are interconnected in a continuous manner with a smooth transition from one face to the other. As best illustrated in FIG. 3, the corners of the aforementioned faces are generally rounded while the step portion of the first section 12 is rectangular, consisting of the front face 16 intersecting the horizontal step face 24 and a portion of the bottom face 28 and side faces 20 and 22. Furthermore, the confines of the interconnected faces of the first section 12 define a hollow space 32 (FIG. 2). The first section 12 is compartmentalized such that the hollow space 32 is divided into chambers. Particularly, a central horizontal partition 34 divides the hollow space 32 into an upper chamber 36 and a lower chamber 38. Both the upper and lower chambers 36 and 38 are preferably lined with sound absorbing material (not shown), the lining keeping with the smooth contours of the faces. For example, acoustic foam may be utilized as an acoustic dampening means.

Referring particularly to FIG. 2, the upper chamber 36 houses a central by-pass motor 40 which creates the suction force required for the central vacuum unit 10 to be operational. The motor 40 is encircled by a perforated cylindrical partition 42 extending the height of the upper chamber 36 between the top face 30 and the horizontal partition 34. An exhaust pipe 44 (FIG. 3) departing tangentially from the motor 40 extends outwards through the perforated cylindrical partition 42 but remains within the confines of the first section 12 in the upper chamber 36. The exhaust pipe 44 is preferably an elbow pipe for redirecting airflow in the tangential direction around the exterior of the perforated cylindrical partition 42.

Still referring to FIG. 2, the lower chamber 38 houses a fan 46 for cooling the motor 40. In this preferred embodiment, the fan 46 is disposed beneath the motor 40 in line therewith and exposed thereto by way of an opening 48 in the horizontal partition 34. The opening 48 is preferably centrally located beneath the motor 40. According to another embodiment, a through-flow motor could be used in place of a by-pass motor and a fan.

Moreover, the fan 46 is partially enclosed by a surrounding wall 50 preferably extending the height of the lower chamber 38 between the horizontal partition 34 and the bottom face 28. The surrounding wall 50 includes an entrance 52 allowing for an airflow originating from a cooling air inlet 54 to enter within the confines thereof. The cooling air inlet 54 for admitting air into the lower chamber 38 may be a perforated floor section 56 in the bottom face 28 of the first section 12.

Naturally, the cooling air inlet 54 may consist of other means and may be located elsewhere. However, it is preferable that the entrance 52 be positioned away from the cooling air inlet 54 so as to reduce the noise level generated by the fan 46 as will be explained in detail furtheron. In the exemplary embodiment illustrated in FIG. 2, the entrance 52 of the surrounding wall 50 is facing the front face 16 while the perforated floor section 56 is adjacent the rear face 18 behind the surrounding wall 50.

Referring to FIG. 2, an exhaust port 58 is situated in the lower chamber 38 disposed in the rear face 18. An elbow duct 60 extends from the exhaust port 58 to an aperture 62 in the central horizontal partition 34 allowing for flow communication therebetween.

Now referring to FIG. 1, first and second working air intake ports 64 and 66 situated in the lower chamber 38 of the first section 12 are shown. The first working air intake port 64 is disposed on the rear face 18 and is intended to be joined to a principal duct (not shown) of the network of suction ducts aforementioned. Naturally, the first intake port 64 may be plugged if not used.

The second working air intake port 66 is disposed on the front face 16 and is intended to be in flow communication with an extension attached thereto: the extension for use as a manual cleaning device as above-described. Preferably, when not being employed, the second intake port 66 is blocked by way of a cap 68 as best shown in FIG. 1.

Still referring to FIG. 1, it can be seen that extending from the first and second intake ports 64 and 66 within the lower chamber 38 are first and second suction ducts 70 and 72 respectively. The ducts 70 and 72 amalgamate at a junction point 74 whereby a third suction duct 76 emerges extending vertically from the lower chamber 38 through the central horizontal partition 34 to an aperture 78 in the top face 30 of the first section 12. Thus, airflow may be communicated from the first and second air intake ports 64 and 66 to the aperture 78 in the top face 30 of the first section 12.

Moreover, the first section 12 houses in the forefront of the lower chamber the electrical controls (not shown) of the central vacuum unit 10. Switches (not shown) for activating and deactivating the central vacuum unit 10 may be operably connected to the controls. The switches may be located at any desired location on the central vacuum unit 10. However, it is understood that the unit could be actuated by other suitable means and as such it could be devoid of any switch.

Now referring to the second section 14 of the central vacuum unit 10 as shown in FIGS. 1 and 2, it can be seen that the second section 14 is adapted to mate with the first section 12 in an overlapping arrangement. The second section 14 is also made up of a front face 80, a rear face 82, two side faces 84 and 86, horizontal and vertical step faces 88 and 90, and is enclosed by a bottom and a top face 92 and 94 respectively. Preferably, the rear and side faces 82, 84, 86 respectively are interconnected in a continuous manner with a smooth transition from one face to the other. As best illustrated in FIG. 3, the corners of the aforementioned faces are generally rounded while the step portion of the second section 14 consisting of the horizontal step face 88 intersecting the vertical step face 90 and a portion of the front face 80 is rectangular.

Notably, the bottom face 92 of the second section 14 is designed to sit upon the top face 30 of the first section 12. Also, the horizontal and vertical step faces 88 and 90 of the second section 14 are configured to match up with the horizontal and vertical step faces 24 and 26 of the first section 12 when in an overlapping arrangement.

Moreover, the confines of the interconnected faces of the second section 14 define a hollow space 96. The second section 14 is compartmentalized such that the hollow space 96 is divided into chambers. Particularly, a pair of smoothed partitions 98 and 100 (FIG. 3) extend towards the front face 80 within the side faces 84 and 86 respectively mirroring the curvature of the rounded corners of the interconnected rear 82 and side faces 84 and 86 (FIG. 3). The smoothed partitions 98 and 100 curve towards each other so as to form a relatively symmetrical cylindrical chamber that will be referred to from hereon as the cyclonic chamber 104.

Referring to FIG. 3, it can be seen that the smoothed partitions 98 and 100 are separated by a gap 102, the latter preferably opposing the rear face 82 of the second section 14. As will be seen hereinafter, the gap 102 provides a lateral discharge for the cyclonic chamber 104. Furthermore, the smoothed partition 98 has a deflector 106 (FIGS. 1 and 2) disposed thereon. The deflector 106 is located at the end of the smoothed partition 98, adjacent the gap 102, extending inwardly with respect to the confines of the cyclonic chamber 104. Preferably the deflector 106 is angled towards the gap 102 as shown in FIG. 3.

Now referring concurrently to FIGS. 1 to 4, the cyclonic chamber 104 houses a cylindrical cage 108 for supporting a filter (not shown) of the type designed to cover the cage 108. The cage 108 is aligned with the motor 40 and preferably centered within the cyclonic chamber 104 and attached to the bottom face 92 thereof. In an exemplary embodiment, the cage 108 is attached to a removable portion 110 of the bottom face 92 of the second section 14. Particularly in FIG. 3, the removable portion 110 is shown as a circular portion greater in diameter than that of the cage 108. Therefore, the cage 108 may be removed from within the cyclonic chamber 104 when the second section 14 is removed from over top the first section 12 by detaching the removable portion 110 from the bottom face 92 and retracting the cage 108 thereby. Notably, the removable portion 110 may be secured to the bottom face 92 by way of various attachment means 112 such as screws and the like.

Referring to FIGS. 1 to 4, it is shown that the cage 108 is centered over a screen 114 disposed in the top face 30 of the first section 12. A second overlapping screen (not shown) could be disposed in the bottom face 92 of the second section 14. The first and second screens allow for flow communication between the first and the second sections 12 and 14 to take place.

More particularly, the first screen 114 is circumscribed by the perforated cylindrical partition 42 acting as a working air inlet for the motor 40 as will be explained in detail furtheron. The second screen could be part of the removable portion 110.

Furthermore, the cyclonic chamber 104 has an aperture 118 (FIG. 3) in the bottom face 92 in line with the aperture 78 in the top face 30 of the first section 12 previously disclosed. Preferably extending from the aperture 118 in the cyclonic chamber 104 is an elbow duct 120 (FIG. 2) for redirecting the airflow in the tangential direction about the cage 108.

Adjacent the cyclonic chamber 104 and disposed in the forefront of the second section 14 on the opposite side of the smoothed partitions 98 and 100 is a debris collecting chamber 122. The debris collecting chamber 122 is delimited by the front face 80, the horizontal and vertical step faces 88 and 90, a portion of the side faces 84 and 86 and the exterior of the smoothed partitions 98 and 100. The gap 102 between the smoothed partitions 98 and 100 acts as a passageway between the cyclonic chamber 104 and the debris collecting chamber 122.

Referring to FIG. 2, the debris collecting chamber 122 may be provided with a trap door 124 disposed in the bottom thereof, particularly in the horizontal step face 88. The trap door 124 can be utilized to dispose of the contents that accumulate in the debris collecting chamber 122 when the central vacuum unit 10 is in operation. Notably, the second section 14 must be removed from on top of the first section 12 to access the trap door 124.

Preferably, the debris collecting chamber 122 has a window (not shown) located in one of the faces: the window allowing verifying the amount of debris present in the chamber 122.

Furthermore, the central vacuum unit 10 is adapted for use with a wall installation kit (not shown). The kit includes a metal box having an air intake duct, an exhaust duct and a flange. The metal box is designed for installment within a wall such that only the flange extends out of the wall. The rear side-by-side air intake port 64 and the exhaust port 58 are adapted to be abutted in flow communication with the principal ducts of the network of suction ducts running through the walls of a building as previously described. The central vacuum unit 10 has a hook 126, as illustrated in FIG. 1 to 3, for hooking into a slot in the flange of the box such that the first working air intake port 64 and the exhaust port 58 abut the air intake and exhaust ports of the box respectively to for a but joint therewith. Therefore, the central vacuum unit 10 is adapted for installation on a wall by way of attachment to the box.

Now, the working airflow and cooling airflow paths of the central vacuum unit 10 with respect to the above-described components will be described in detail. In the case of the working air flow, the motor 40 of the central vacuum unit 10 creates a suction force so as to draw working air into the unit 10. The working air is admitted into the central vacuum unit 10 from either the first and/or the second working air intake ports 64, 66. Then the working air flows through the first and/or second suction ducts 70, 72 to the third suction duct 76 which redirects the working air upwardly out of the first section 12 of the central vacuum unit 10. Thus, the working air exits the aperture 78 in the top face 30 of the first section 12 and enters the cyclonic chamber 104 of the second section 14 through the aperture 118 in the bottom face 92 thereof. The working air is then redirected by the elbow duct 120 to flow around the cyclonic chamber 104 such that the flow is tangential to the cage 108.

Thus, a cyclonal effect is created within the cyclonic chamber 104. The working air is consequently subjected to a centrifugal force such that a majority of the air and debris is forced towards the faces of the cyclonic chamber 104. More specifically, the whirlwind that is created causes a majority of the debris including dust particles and other matter in the working air to move radially outwards only to be contained by the faces of the cyclonic chamber 104. When the debris reaches the gap 102 between the smoothed partitions 98 and 100 and makes contact with the deflector 106, it is subsequently deflected laterally. Preferably, the debris is laterally deflected into the debris collecting chamber 122.

The debris accumulates in the debris collecting chamber 122 until it is emptied whereby the trap door 124 is opened so that the debris may be disposed of. Advantageously, collecting the debris in a chamber 122 separate from the chambers housing the cage 108 and the motor 40 eliminates the loss of vacuum or suction force. More specifically, the vacuum force derived from the motor 40 may be maintained at a high level when the filter (not shown) on the cage 108 remains unblocked. Thus, in the present embodiment the debris collecting chamber 122 may be filled up until the height of the vertical step portion 90 without hindering the performance of the motor and more specifically the vacuum force. After this point however, the debris may begin to fill the cyclonic chamber 104 rather than remain in the debris collecting chamber 122 and consequently affect the vacuum force.

Moreover, the vacuum force created by the motor 40 sucks a portion of the working air in the center of the cyclonic chamber 104 into the cage 108 through the filter thereon. The filtered working air then enters the upper chamber 36 within the confines of the perforated cylindrical partition 42 and is inhaled by the motor 40. The latter ejects the air out through the exhaust pipe 44 such that it flows around the upper chamber 36 outside the perforated cylindrical partition 42. Thus, the noise level generated may be dampened by having the air flow around the motor 40 before exhausting it from the central vacuum unit 10.

After circling around the upper chamber, the air is then exhausted by way of the aperture 62 in the horizontal partition, through the elbow duct 60 in the lower chamber 38, and out the exhaust port 58. The exhaust port 58 may be adjoined to a exhaust receiving duct (not shown) that directs the air through the walls of a building to an exterior environment, or the exhaust port 58 may be covered by a filter (not shown) and exposed to the immediate environment.

In the case of the cooling air, the fan 46 draws cooling air into the central vacuum unit 10 through the cooling air inlet 54. The cooling air then travels around the exterior of the surrounding wall 50 of the fan 46 and in through the entrance 52 leading to the fan 46. It is preferable that the cooling air surrounds the surrounding wall 50 so as to dampen the noise generated by the fan 46.

The fan 46 inhales the cooling air redirecting it upwardly into the motor 40 through the opening 48 in the horizontal partition 34. Hence, the cooling air cools the motor 40 as it circulates within the confines of the perforated cylindrical partition 42.

Furthermore, the cooling air is then drained out through the perforations in the partition 42 due to an existing pressure difference between the region outside of the partition and the region within the partition. As the pressure of the outside region is less than that of the inside region, naturally the cooling air is induced to flow radially outwards through the perforations from a region of high pressure to a region of low pressure. The cooling air is drawn out of the central space circumscribed by the perforated partition 42 by the flow of working air discharged from the motor 40. The cooling air then mixes with the filtered working air flowing around the partition 42. The mixture of both the filtered working air and the cooling air is then exhausted out of the central vacuum unit 10 via the exhaust port 58 as previously explained.

Advantageously, having the cooling air drain out through the perforated cylindrical partition 42 increases the overall heat transfer whereby heat is eliminated from the motor 40. Therefore, the motor 40 may perform with greater efficiency as the heat eliminated is maximized. Also, it is preferable to have the cooling air mix with the filtered working air and be expulsed thereafter so as to eliminate the need for any additional components that may be required to exhaust the cooling air separately. This also advantageously allows to trap and evacuate the carbon dust generated by the motor 40 in the outgoing flow of working air and cooling air through the outlet 58 and into the duct network of the apartment or the house, thereby preventing release of carbon dust in the immediate environment of the central vacuum unit 10.

As should be apparent from the above detailed description, the present invention provides significant advantages over existing central vacuum units. Another advantage being that the central vacuum unit 10 is compact in the vertical direction which enables it to fit into places where other existing central vacuum units cannot fit. The debris collecting chamber 122 is located laterally rather than vertically with respect to the chambers housing the cage 108 and motor 40, thus resulting in a more compact unit configuration. The above described embodiment is also advantageous in that it has a debris collecting chamber 122 which is separate from the chambers housing the cage 108 and the motor 40, thereby preventing premature clogging of the filter and thus rapid loss of suction power.

A further advantage being that it is easy to clean. Firstly, this is due to the fact that the cage 108 does not remain attached to the motor 40 when the debris collecting chamber 122 is removed in order to be emptied. The central vacuum unit 10 has detachable separate first and second sections 12, 14. Thus, the second section 14 may be entirely removed from the first 12 and transported to the disposal area to avoid any mishaps when disposing of the debris. The debris is collected in a chamber separate from the chamber housing the cage 108 and filter; therefore, the debris collecting chamber 122 may be emptied without exposing the cage 108 and filter thereon. Since the filter conventionally does not need to be changed as often as the debris must be disposed of, the cleaning procedure is shortened and facilitated. Thirdly, when the filter does necessitate changing, the cage 108 may be removed by way of the removable portion 110 in the bottom face 92 of the second section 14. Once removed, the cage 108 may be easily cleaned over a trash can or the like.

Still another advantage being that the motor 40 is disposed below the cage 108. This component orientation in combination with the above described features enables the central vacuum unit 10 to overcome some of the disadvantages previously set forth.

Still a further advantage being that the present invention with safety in mind. Due to the fact that the motor 40 is entirely enclosed in the first section 12, the motor 40 remains covered even when the second section 14 is detached from the first 12.

Yet another advantage being that the present invention can be sold as a kit including: the central vacuum unit 10 and the wall installation kit.

Although the present central vacuum unit has been described with a certain degree of particularity, it is to be understood that the disclosure has been made by way of example only and that the present invention is not limited to the features of the embodiments described and illustrated herein, but includes all variations and modifications within the scope of the invention as hereinafter claimed.

We claim:

1. A central vacuum unit comprising a cyclonic chamber having a sidewall, and a motor causing a swirl of air loaded with debris to centrifugally contact an inner surface of the sidewall of said cyclonic chamber, and a lateral outlet defined through said sidewall to provide for lateral discharge of the debris flowing along said sidewall, wherein the motor is surrounded by a perforated partition, the perforated partition defining a cooling air chamber about the motor, said cooling air chamber being connected in flow communication with a cooling air intake, and wherein a working air flow path is provided about the perforated partition, the cooling air in the cooling air chamber being allowed to flow into the working air flow path through said perforated partition.

2. A central vacuum unit as defined in claim 1, wherein the motor is housed in a first housing section and the cyclonic chamber forms part of a second housing section, the first and second housing sections being connectable in flow communication, and wherein a cage extends axially into the cyclonic chamber, the cage being adapted to receive a filter thereon, the cage and the second housing section being jointly removable from the first housing section.

3. A central vacuum unit as defined in claim 1, wherein the cooling air and the working air are jointly discharged from the unit through a common outlet.

4. A central vacuum unit as defined in claim 1, wherein said cooling air intake is provided in a bottom face of said unit, and wherein said motor is located directly underneath said cyclonic chamber.

5. A central vacuum unit as defined in claim 1, wherein said unit is provided with side-by-side air intake and air exhaust ports.

6. A central vacuum unit as defined in claim 1, wherein a partition is provided between said cooling air intake and said air cooling chamber to force incoming cooling air to flow along an air cooling path before being admitted in said cooling air chamber.

7. A central vacuum unit as defined in claim 6, wherein said partition at least partly surrounds a fan coupled to said motor to provide cooling air thereto, said partition forcing the cooling air from said cooling air intake to contour said fan.

8. A central vacuum unit as defined in claim 1, wherein a deflector extends from said sidewall inwardly into said cyclonic chamber at a location adjacent to said lateral outlet.

9. A central vacuum unit as defined in claim 8, wherein said deflector is located on a downstream side of said lateral outlet relative to the flow of air in said cyclonic chamber.

10. A central vacuum unit as defined in claim 1, further including a debris collection receptacle for receiving the debris from said cyclonic chamber through said lateral outlet, said debris collection receptacle being laterally disposed relative to said cyclonic chamber.

11. A central vacuum unit as defined in claim 10, wherein the debris collection receptacle and the cyclonic chamber are jointly removable as a unit from the motor.

12. A central vacuum unit as defined in claim 10, wherein a cage extends axially into said cyclonic chamber, the cage being adapted to receive a filter thereon, and wherein the cage is axially offset relative to the debris collection receptacle.

13. A central vacuum unit as defined in claim 12, wherein the cage is located at a higher elevation than a bottom of said debris collection receptacle and above said motor.

14. A central vacuum unit as defined in claim 12, wherein the cage and the cyclonic chamber are removable as a single unit from the motor.

* * * * *

UNITED STATES PATENT AND TRADEMARK OFFICE
CERTIFICATE OF CORRECTION

PATENT NO. : 7,615,090 B2  Page 1 of 1
APPLICATION NO. : 11/350099
DATED : November 10, 2009
INVENTOR(S) : Archambault et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this

Nineteenth Day of October, 2010

David J. Kappos
*Director of the United States Patent and Trademark Office*